April 17, 1956 N. D. LARKY ET AL 2,742,525

COLOR TEST PATTERN GENERATOR

Filed April 27, 1951 3 Sheets-Sheet 1

INVENTORS
NORBERT D. LARKY
DAVID D. HOLMES

BY [signature]
ATTORNEY

INVENTORS
NORBERT D. LARKY
DAVID D. HOLMES

BY [signature]
ATTORNEY

COLOR TEST PATTERN GENERATOR

Filed April 27, 1951 3 Sheets-Sheet 3

INVENTORS
NORBERT D. LARKY
DAVID D. HOLMES
BY
ATTORNEY 2,742,525

COLOR TEST PATTERN GENERATOR

Norbert D. Larky, Somerville, and David D. Holmes, New Brunswick, N. J., assignors to Radio Corporation of America, a corporation of Delaware Application April 27, 1951, Serial No. 223,278

10 Claims. (Cl. 178—5.4)

This invention relates to apparatus for generating signals representing a test pattern useful in color television.

Heretofore a slide scanner has been used almost exclusively for generating test patterns. However, the slide scanner was designed primarily for pictorial photographic slides. For application where regular geometric designs are sufficient, the color test signal generator that is the subject of this invention offers simplified operation and lower cost of construction. In addition it has precise linearity and freedom from noise and produces signals representing primary colors that are not dependent upon the quality of film dyes.

Accordingly it is the purpose of this invention to provide a simplified and improved apparatus for deriving signals representing a test pattern for color television equipment.

The manner in which the above objectives may be achieved will be more clearly understood from a detailed consideration of the drawing in which.

Figure 1:
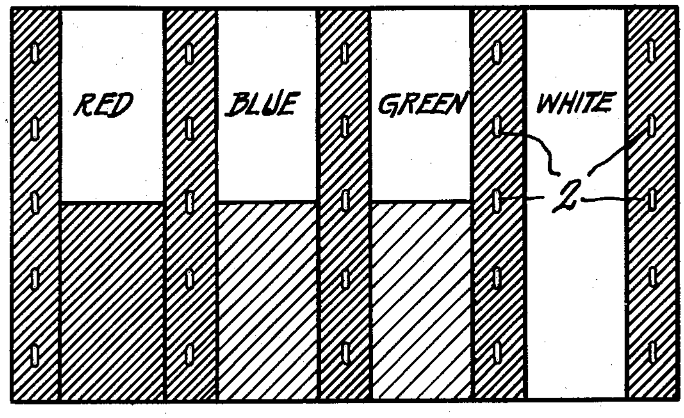
Figure 1 illustrates graphically a type of test pattern that may be generated.

One type of test pattern that may be reproduced from signals generated in accordance with the principle of this invention is illustrated in Figure 1 showing a scanning raster wherein the upper half of the raster is indicative of color and the lower half of the raster is indicative of gamma. In certain types of kinescopes white dots 2 are useful in determining the degree of registration with which the different component colors are reproduced.

Figure 2:
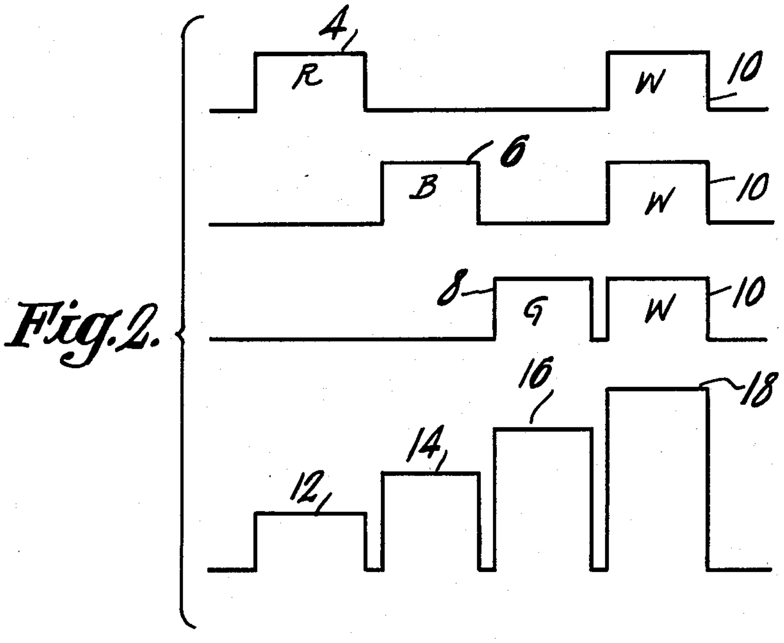
Figure 2 illustrates graphically the type of signals that must be generated in order to produce the test pattern in Figure 1.

The signals required to form the test pattern of Figure 1 are illustrated in Figure 2. In order to reproduce a red bar during the first quarter of each line in the upper half of the raster a pulse indicated by numeral 4 is generated during the first fourth of a horizontal line and applied to a channel in the system where red video signals are normally applied. In a similar way, pulses 6 and 8 are generated during the second and third quarters of the line and applied to the different channels in the system to which the blue and green components are normally applied. In order to reproduce the white component, however, substantially equal signals must be applied to each of the color channels, and therefore pulses 10 are generated during the last quarter of each line and separately combined with each of the pulses 4, 6, and 8.

In order to produce pulses representing various shades of gray as indicated in the lower half of the raster of Figure 1, pulses of successively greater height are to be developed as the horizontal line is scanned. The relative horizontal positions of the gray pulses 12, 14, 16, and 18 are in vertical registry with the red pulse 4, the blue pulse 6, the green pulse 8, and the white pulse 10 respectively. Therefore, the gamma pulses 12, 14, 16, and 18 can be derived by suitably adjusting the amplitudes of pulses 4, 6, 8, and 10, combining them during the transmission of a single line and applying them to each color channel.

Figure 3:
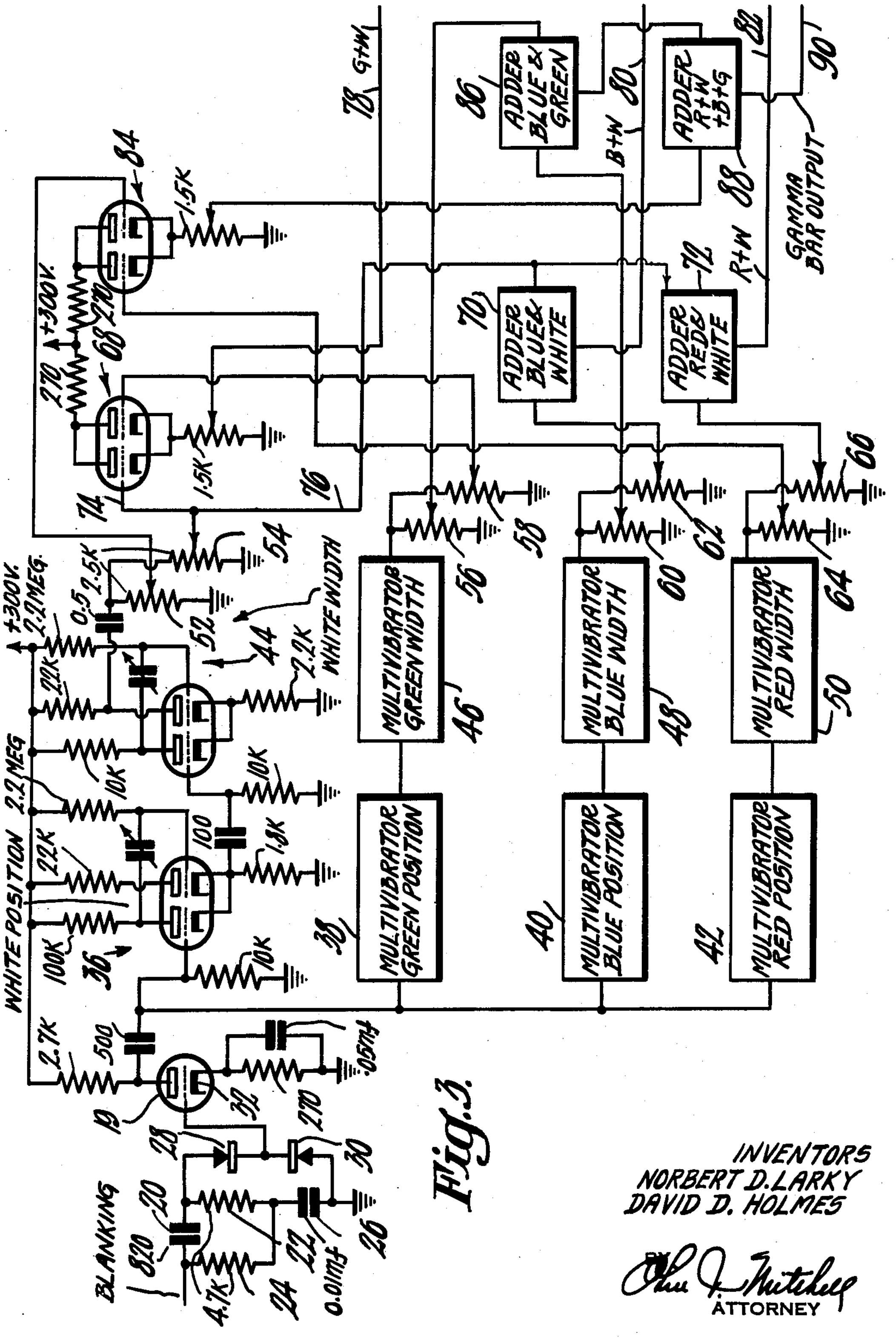
Figures 3 and 4 illustrate by circuit diagram one form of apparatus for obtaining the signals shown in Figure 2.

Figure 3 illustrates apparatus for deriving pulses such as indicated in Figure 2. Pulse generators are triggered at the beginning of each line by the negative pips derived by differentiating the positive blanking wave normally present at a television transmitter. These negative pips therefore occur at the trailing edge of both the vertical and horizontal blanking pulse that make up the blanking wave. Due to the standard odd line interlace, however, the negative pip produced at the end of alternate vertical blanking pulses occurs at a point in the middle of a line interval. If the pulse were permitted to trigger the signal generators then the red bar of Figure 1 would occur during the third quarter of at least the first line of the raster and the green and white pulse would occur during the succeeding horizontal blanking interval. As D. C. level setters normally use the height of the horizontal blanking pulses as a reference, the presence of the green and white bar signals would be troublesome.

Therefore, the negative pips at the trailing edge of all the vertical blanking pulses are prevented from triggering the signal generators by coupling them to a triggering or keying tube 19 via an input circuit including in addition to a differentiation network comprised of a condenser 20 and a resistor 22, an integrating network comprised of resistor 24 and a condenser 26. The condenser 26 of the integration network is connected in series with the differentiation network so that the differentiated blanking pulses are superimposed or added to the integrated blanking pulses. Unilateral conducting devices 28 and 30 are connected in series opposition and in parallel with the resistor 22 and condenser 26. The grid 32 of the triggering tube 19 is connected to a junction between the unilateral conducting devices 28 and 30.

This input circuit to the grid 32 of the triggering tube 19 operates as follows: The differentiation of the blanking pulses supplies positive going and negative going pips. The pips of positive voltage are prevented from reaching the grid 32 because of the polarity of the unilateral device 28. However, the negative going pips of sufficient amplitude pass through the unilateral device 28 and through the back resistance of the unilateral device to ground thus providing a voltage at the grid 32. The integration circuit comprised of the resistor 24 and condenser 26 has a sufficiently long time constant so as to integrate the positive vertical blanking pulses. When the negative pip at the trailing edge of the vertical blanking pulse is added to the positive voltage produced by the integrator it is not sufficiently large to produce a negative voltage with respect to ground and therefore does not pass through the unilateral device 28.

The negative pips that do pass the device 28 produce a positive pulse at the plate of the trigger tube 19 which is in turn applied to each of four multivibrators generally indicated by the numerals 36, 38, 40, and 42. Only the multivibrator 36 is shown in detail, the other multivibrators being of similar construction. In this particular example, a cathode coupled multivibrator is shown but any multivibrator that reverts to its original polarity at some predetermined time following the triggering action may be used.

In each of the particular cathode coupled multivibrators shown there are two tubes, one normally conducting and the other normally cut off. The tube that is normally cut off has a larger plate load resistor than the other one and therefore the cathode potential of the two tubes decreases when this normally cut off tube is triggered and into conduction. When the multivibrators 36, 38, 40, and 42 revert to their original polarity their cathode potential increases and this positive voltage serves to trigger similar corresponding multivibrators indicated generally by the numerals 44, 46, 48, and 50. Although all the multivibrators 36, 38, 40, and 42 are triggered at the beginning of a line interval they may be adjusted as is well known to those skilled in the art, to revert to their initial polarities or conducting conditions at different times during this line interval. Thus, the recovery time of the multivibrator 36 may be set at a point nearly 75% the way along a horizontal line at which point it triggers the corresponding multivibrator 44. The multivibrator 44 then may be made to supply the white pulses 10 of Figure 2. In a similar fashion the recovering time of the multivibrators 38, 40, and 42 may be set so as to trigger the multivibrators 46, 48, and 50 at times corresponding to the leading edge of the pulses 6, 8, and 10 of Figure 2. The recovering times of the multivibrators 46, 48, and 50 determine the position of the trailing edges of the pulses 6, 8, and 10 respectively.

The multivibrator 44 supplies positive pulses 10 to the parallel potentiometers 52 and 54. The pulse 8 in Figure 2 is supplied by the multivibrator 46 in positive polarity to parallel potentiometers 56 and 58. The positive pulse 6 is supplied by the multivibrator 48 to the parallel potentiometers 60 and 62 and the multivibrator 50 supplies the positive pulse 4 of Figure 2 to parallel potentiometers 64 and 66.

Adders generally indicated by the numerals 68, 70, and 72 serve to combine the white pulses 10 with each of the pulses 8, 6, and 4 respectively as is required for the upper half of the raster in Figure 1. Only the adder 68 is shown in detail and it is assumed that the adders 70 and 72 function similarly. The positive white pulses 10 appearing across the potentiometer 54 are supplied to one side of each of the adders 68, 70, and 72 via leads 74 and 76. The green pulse 8 appearing across the potentiometer 58 is applied to the other side of the adder 68. The blue pulse 6 appearing across the potentiometer 62 is applied to the adder 70 and the red pulse 4 appearing across the potentiometer 66 is applied to the adder 72. Thus the output of the adder 68 at terminal 78 consists of green and white pulses 8 and 10, the output of the adder 70 at terminal 80 consists of the blue and white output pulses 6 and 10, and the red and white pulses 4 and 10 appear at the output terminal 82 of the adder 72.

It remains to combine the separate color pulses 4, 6, and 8 and the white pulses 10 that are supplied by the multivibrators 44, 46, and 48 and 50 so as to form the gamma or linearity bars 12, 14, 16, and 18 of Figure 2. This operation is performed in the adders indicated by the numerals 84, 86, and 88. Examination of the connections in Figure 3 shows that the red pulses 4 that appear across the potentiometer 64 at the output of the multivibrator 50 are supplied to one side of the adder 84 and that the white pulses 10 appearing across the potentiometer 52 at the output of the multivibrator 44 are supplied to the other side of the adder 84. The potentiometers 52 and 64 are respectively adjusted so that the desired heights of the gamma pulses 12 and 18 of Figure 2 are attained. In a similar fashion the blue pulses 6 appearing across the potentiometer 60 at the output of the multivibrator 48 and the green pulse 8 appearing across the potentiometer 56 at the output of the multivibrator 46 are supplied to the adder 86 so as to produce the pulses 14 and 16 at their desired amplitudes. In this way the adder 84 supplies the gamma pulses 12 and 18 and the adder 86 provides the gamma pulses 14 and 16. The output of these adders is then combined in the adder 88 so as to produce the gamma bars 12, 14, 16, and 18 at an output terminal 90.

Figure 4:
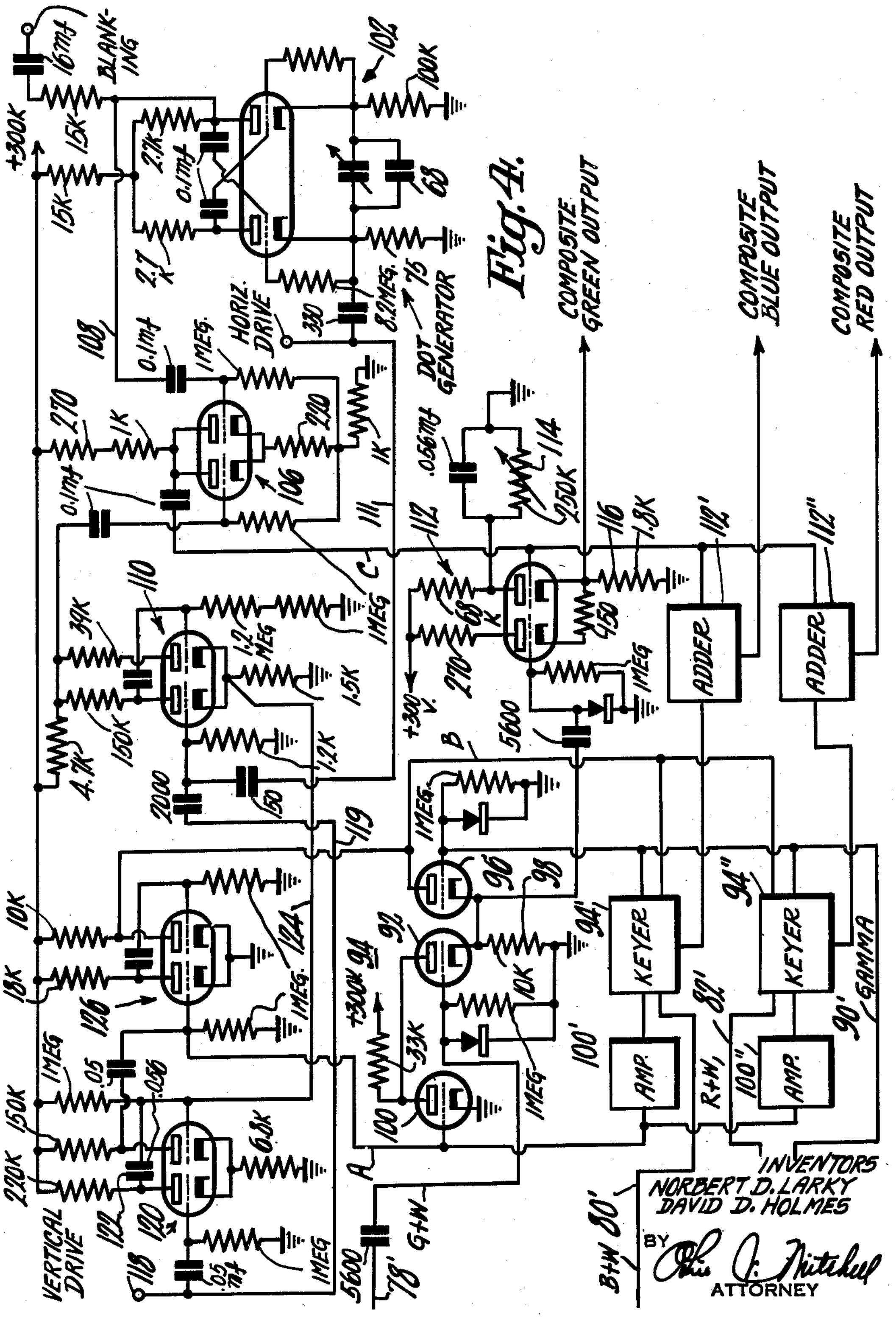

The following discussion relates to the apparatus and methods whereby the various pulses supplied by the apparatus of Figure 3 are keyed into the color transmission channels at the proper times so that they may be reproduced to form the pattern indicated in Figure 1. The input terminals 78′, 80′, 82′, and 90′ in Figure 4 are coupled to corresponding output terminals 78, 80, 82, and 90 of Figure 3. The green and white pulses indicated by the numerals 8 and 10 respectively of Figure 2 are thus present at the input terminals 78′ and are coupled after suitable clamping to one tube 92 of a two tube keyer 94.

The gamma pulses indicated by the numerals 12, 14, 16, and 18 of Figure 2 are present at the terminal 90′ and are applied to the other tube 96 of the keyer 94. If the tube 92 is conductive, the signals representing the green and white bars 8 and 10 appear across the resistor 98, and if the tube 96 is conductive, the gamma bars 12, 14, 16, and 18 appear across the resistor 98.

During the first half of a field the tube 92 is made conductive and during the second half of the field the tube 96 is made conductive. This is accomplished by pulses appearing at points "A" and "B" that are negative during the top half of a field and positive during the bottom half of a field.

The manner in which these pulses are derived will be described below. The pulses at point "A" are applied to the plate of the tube 92 through an isolating amplifier 100 which serves to invert the polarity of the pulses appearing at point "A" and to prevent any signals at the grid of the tube 92 from reaching the point "A." During the top half of the raster, therefore, the keyer tube 92 is conductive but because the same negative pulses appearing at point "B" are applied to the plate of the tube 96 this tube is nonconductive. During the bottom half of the raster of Figure 1, however, the pulses at points "A" and "B" are positive so that the conducting relationships of the tubes 92 and 96 are reversed and the gamma bar signals 12, 14, 16, and 18 of Figure 2 that appear at the input terminal 90 are passed through the tube 96 to the common cathode resistance 98.

The pulses appearing at points "A" and "B" in the circuit are also connected via the amplifier 100′ and 100″ to the keyers 94′ and 94″. Thus when the pulses at points A and B are negative the color bar signals are passed to the output circuits of keyers 94, 94′, and 94″, and when the pulses at points A and B are positive the gamma bar signals appear at the outputs of keyers 94, 94′, and 94″. The amplifiers 100, 100′, and 100″ prevent cross talk between the color bar signals applied at the inputs of the keyers 94, 94′, and 94″. Similar isolation is not necessary in coupling the pulses at point B to the keyers as the same gamma pulses are applied to each keyer.

The following discussion relates to the manner in which the dot signals are generated. Narrow pulses that are to be used in reproducing dots are generated by a free running multivibrator 102 that oscillates at a multiple of line frequency. The duration of these pulses determines the width of the dots. Preferably, the frequency is such as to place the dots in the black bars on either side of the wide bars of Figure 2. The multivibrator 102 may be triggered at the beginning of each horizontal line of the raster by the horizontal drive pulses. In addition or alternatively, it may be prevented from operating during vertical and horizontal blanking by application of the blanking wave as shown. The pulses of dot frequency occur during every line of a field and are supplied by the generator 102 to an adder 106 via a lead 108.

The other side of the adder 106 is coupled to the output of a multivibrator 110 that is adjusted to oscillate at a multiple of the field frequency. The multivibrator 110 is free running but is synchronized by horizontal drive pulses supplied by the lead 111 so that it produces positive pulses that begin at the beginning of a line. In order that these positive output pulses may occur during corresponding lines of even fields and corresponding interlaced lines of odd fields, the multivibrator 110 is also synchronized with vertical drive pulses over the lead 119. The duration of the positive pulses supplied by this multivibrator determines the number of consecutive lines that are to bear dots. The output of the adder 106 is therefore comprised of a summation of the pulses of multiple field frequency derived from the multivibrator 110 and the pulses of multiple line frequency derived from the generator 102. Whenever these pulses occur simultaneously, the output of the adder 106 is more positive than when they occur at different times.

The dot pulses at the output of the adder 106 are applied via line "C" to adders 112, 112', and 112" where they are combined with the color bar or gamma bar signals as the case may be. The other side of the adder 112, for example, is coupled to the output of the keyer 94 which provided the green and white bar signals 8 and 10 during the top half of the raster, and gamma bar signals 12, 14, 16, and 18 during the bottom half of the raster. The plate voltage of the right hand tube of the adder 112 is made so low by adjusting the variable resistor 114 that only the high positive pulses from the adder 106 cause it to conduct to any substantial degree and to furnish a dot pulse to a cathode resistor 116. Also appearing across this cathode resistor 116 are the green and white color bars (or the gamma bars, as the case may be) that are supplied by the other half of the adder 112. In a similar way the adders 112' and 112" provide signals including the dot signals from the adder 106 and the color bar or gamma bar signals from the keyers 94' and 94" respectively.

The vertical position of the horizontal rows of dots is controlled by applying vertical drive pulses from an input terminal 118 to one side of the multivibrator 110.

The following discussion relates the manner in which the keyers 94, 94', and 94" are reversed in polarity in order to change their outputs from color bar signals to gamma bar signals at the midpoint of each field. The vertical drive pulses appearing at the input 118 are applied to a sync multivibrator 120 that is adjusted to operate at field frequency. The components associated with the multivibrator are so selected that the multivibrator tends to reverse polarity half way through a field. The particular line at which this reversal occurs is determined by applying an output pulse from the multivibrator 110 so as to trigger the multivibrator 120. Thus when the left hand side of the multivibrator 120 receives a positive vertical drive pulse it is placed in a conducting condition and the right hand side of the multivibrator is not conducting. About the middle of the field the condenser 122 is discharged to the point where the right hand half of the multivibrator 120 is nearly ready to conduct again. Therefore, the pulses supplied by the lead 124 from the multivibrator 110 cause the multivibrator 120 to flip over and reverse its conducting condition. The 60 cycle pulses thus derived at the right hand half of the multivibrator 120 are applied to point B in a circuit through an amplifier 126 and they are supplied directly to the point "A." The manner in which these pulses are employed to operate the keyers 94, 94', and 94" has previously been explained.

As will be apparent to those skilled in the art, it is possible to use the pattern signal generator disclosed above so that other patterns could be represented, for example, the color and/or gamma bars could run horizontally.

Having described our invention, what is claimed is:

1. In a test pattern signal generator the combination of a first group of multivibrators, said multivibrators having a state of stable and unstable polarity, triggering apparatus adapted to cause said multivibrators to reverse to an unstable polarity at the beginning of each line of a raster, a second group of multivibrators each one of which is coupled so as to be triggered when one of said first group of multivibrators reverts to a stable polarity, a first group of adders each having a plurality of inputs and outputs, one of said inputs being connected to the output of a selected one of said second group of multivibrators, the other inputs being connected to a different one of the remaining multivibrators of the second group, a potentiometer connected to the outputs of each of said second group of multivibrators, and a second group of adders adapted to combine the outputs of each of said potentiometers.

2. In a test pattern signal generator the combination of a plurality of keyers, each of said keyers having two groups of inputs and a single output, said keyers being adapted to selectively connect one or the other groups of inputs to said output, one of said groups of inputs being tied together, a dot generator operating at a multiple of line frequency, a multivibrator operating at a multiple of field frequency, a first adder to which the output of said dot generator and multivibrator are applied, a plurality of adders, each of said adders having two inputs and an output, one of said inputs being connected to the output of a different one of said keyers, the other to the output of said first adder, each of said plurality of adders being responsive to the output of said first adder only when this output represents the coincidence of the pulses supplied by said dot generator and the pulses supplied by said multivibrator.

3. A color test pattern generator for color television apparatus in a system of the type having means for scanning an object at horizontal and vertical frequencies and a plurality of color channels, each of such channels having means for operating upon an electrical signal indicative of the intensity of a component color, and wherein the amplitude of each such signal is representative of such intensity, which comprises: means synchronized to the horizontal and vertical frequencies of such television system for producing sequentially and repetitively a plurality of signal pulses, each pulse being of predetermined standard amplitude and representative of one of such component colors, such that successive pulses representative of a given component color are spaced a predetermined amount in time and occur, at least in part, in the absence of pulses representative of another color; and a plurality of output terminals for coupling respectively to said plurality of color channels in such manner that successive pulses representative of a given component color are applied to the corresponding color channel.

4. A color test pattern generator for color television apparatus in a system of the type having means for scanning an object at horizontal and vertical frequencies and a plurality of color channels, each of such channels having means for operating upon an electrical signal indicative of the chroma of a component color, and wherein the amplitude of each such signal is representative of such chroma, which comprises: a plurality of means for producing pulses of standard amplitude; means synchronized to the horizontal and vertical frequencies of such television system for triggering said pulse producing means sequentially and in such manner that the pulses produced by one of said pulse producing means occur, at least in part, at times in which the other pulse producing means are inactive to produce pulses; and means for applying selected combinations of such pulses to a plurality of output terminals adapted for connection to corresponding channels of such system.

5. A color test pattern generator for color television apparatus in a system of the type having means for scanning an object repeatedly during successive intervals and a plurality of color channels, each of such channels having means for operating upon an electrical signal indicative of the intensity of a component color, and wherein the amplitude of each such signal is representative of such intensity, which comprises: a plurality of means for producing pulses of standard amplitude; means for triggering each of said pulse producing means sequentially during a television scanning interval such as to produce, during said interval, a series of pulses, each pulse being representative of a given component color, one of the pulses produced by each of said pulse producing means during said interval being timed to coincide, at least in part, with the corresponding pulse produced during that interval by another of said pulse producing means; and means for coupling all pulses corresponding to a given color to such channel which operates upon signals indicative of the intensity of that color.

6. In a color test pattern generator for color television apparatus in a system of the type having a plurality of color channels, each of such channels having means for operating upon an electrical signal indicative of the chroma of a component color and each of such channels having means for generating light in sequential elemental areas such that areas thus energized by the plurality of channels are normally in substantial proximity, dot pattern generating apparatus for producing a signal suitable for providing a visible indication of such proximity, which comprises: means for producing a series of pulses at a multiple of television line frequency; means for producing pulses at a multiple of television field frequency; an adder to which said pulses are applied; means for providing pulses in response to the output of said adder when said output multiple field frequency and multiple line frequency pulses coincide; and means for applying said last-named pulses to each of such color channels.

7. A color test pattern generator for testing color television apparatus in a system of the type in which an object is scanned during successive intervals and which includes a plurality of individual color channels, each of such channels having means for operating upon an electrical signal whose amplitude is representative of the intensity of a component color of such television object, which test generator comprises: pulse producing means for producing, within such interval, a plurality of pulses, each of fixed amplitude and each occurring, at least in part, at a time when no other pulse occurs; a plurality of output terminals, each adapted for connection to one of such color channels for applying signals to such channels, respectively; and means for selectively applying pulses representative of such component colors to corresponding ones of said terminals.

8. A color test pattern generator for testing color television apparatus in the system of the type in which an object is scanned during successive intervals and which has a plurality of individual color channels, each of such channels having means for operating upon an electrical signal whose amplitude is representative of the intensity of a component color of such television object, which test generator comprises: a first pulse generator for producing time-spaced pulses of standard amplitude and representative of the intensity of a first component color of an object; a second pulse generator for producing time-spaced pulses of standard amplitude and representative of the intensity of a second component color of such object; means for causing said first and second generators to produce pulses within said interval in such manner that a pulse from one of said generators occurs, at least in part, at a time between the pulses of the other of said generators; a plurality of output terminals, each including a connection to one of such color channels of such apparatus being tested; means for applying pulses from said first generator to one of said terminals; and means for applying pulses from said second generator to another of said terminals.

9. A color test pattern generator for testing color television apparatus in a system of the type in which an object is scanned during successive intervals, which apparatus has a plurality of individual color channels, each of such channels having means for controlling the intensity of light of a selected component color of an object in response to the amplitude of a signal applied thereto, which test generator comprises: means for producing, within said interval, a plurality of pulses, each of a fixed amplitude and each occurring, at least in part, at a time when no other pulses occur; a plurality of output terminals, each adapted for connection to one of such color channels; and means for selectively applying pulses representative of such component colors to corresponding ones of said terminals, such that such light-controlling means successively control light of different colors during the occurrence of said pulses.

10. A color test pattern generator for testing color television apparatus in a system of the type in which an object is scanned during successive intervals, which apparatus includes a plurality of individual color channels, each of such channels having means for operating upon an electrical signal whose amplitude is representative of the intensity of a component color of a television object, such apparatus further including color image reproducing means responsive to the amplitude of such signals for reproducing an image of such object in such colors, which test generator comprises: a first pulse generator for producing time-spaced pulses of standard amplitude and representative of the intensity of a first component color of an object; a second pulse generator for producing time-spaced pulses of standard amplitude and representative of the intensity of a second component color of such object; means for causing said first and second generators to produce pulses within said interval in such manner that a pulse from one of said generators occurs, at least in part, at a time between the pulses of the other of said generators; a plurality of output terminals, each including a connection to one of such color channels of such apparatus being tested; means for applying pulses from said first generator to one of said terminals; and means for applying pulses from said second generator to another of said terminals, such that said image reproducing means produce light of a first color during the occurrence of pulses from said first pulse generator and of another color during the occurrence of pulses from said second pulse generator.

References Cited in the file of this patent

UNITED STATES PATENTS

| | | |
|---|---|---|
| 2,405,239 | Seeley | Aug. 6, 1946 |
| 2,422,204 | Meacham | June 17, 1947 |
| 2,425,131 | Snyder | Aug. 5, 1947 |
| 2,466,044 | Schoenfeld | Apr. 5, 1949 |
| 2,516,972 | Gannaway | Aug. 1, 1950 |
| 2,518,013 | Houghton | Aug. 8, 1950 |
| 2,541,039 | Cole | Feb. 13, 1951 |
| 2,557,729 | Eckert, Jr. | June 19, 1951 |
| 2,602,918 | Kretzmer | July 8, 1952 |
| 2,668,188 | Naslund | Feb. 2, 1954 |
| 2,677,721 | Bedford | May 4, 1954 |

FOREIGN PATENTS

| | | |
|---|---|---|
| 233,313 | Switzerland | Oct. 16, 1944 |
| 996,919 | France | Dec. 28, 1951 |